Nov. 29, 1932.   R. D. HYATT   1,889,070
HUB CAP FASTENER
Filed May 29, 1930   2 Sheets-Sheet 1
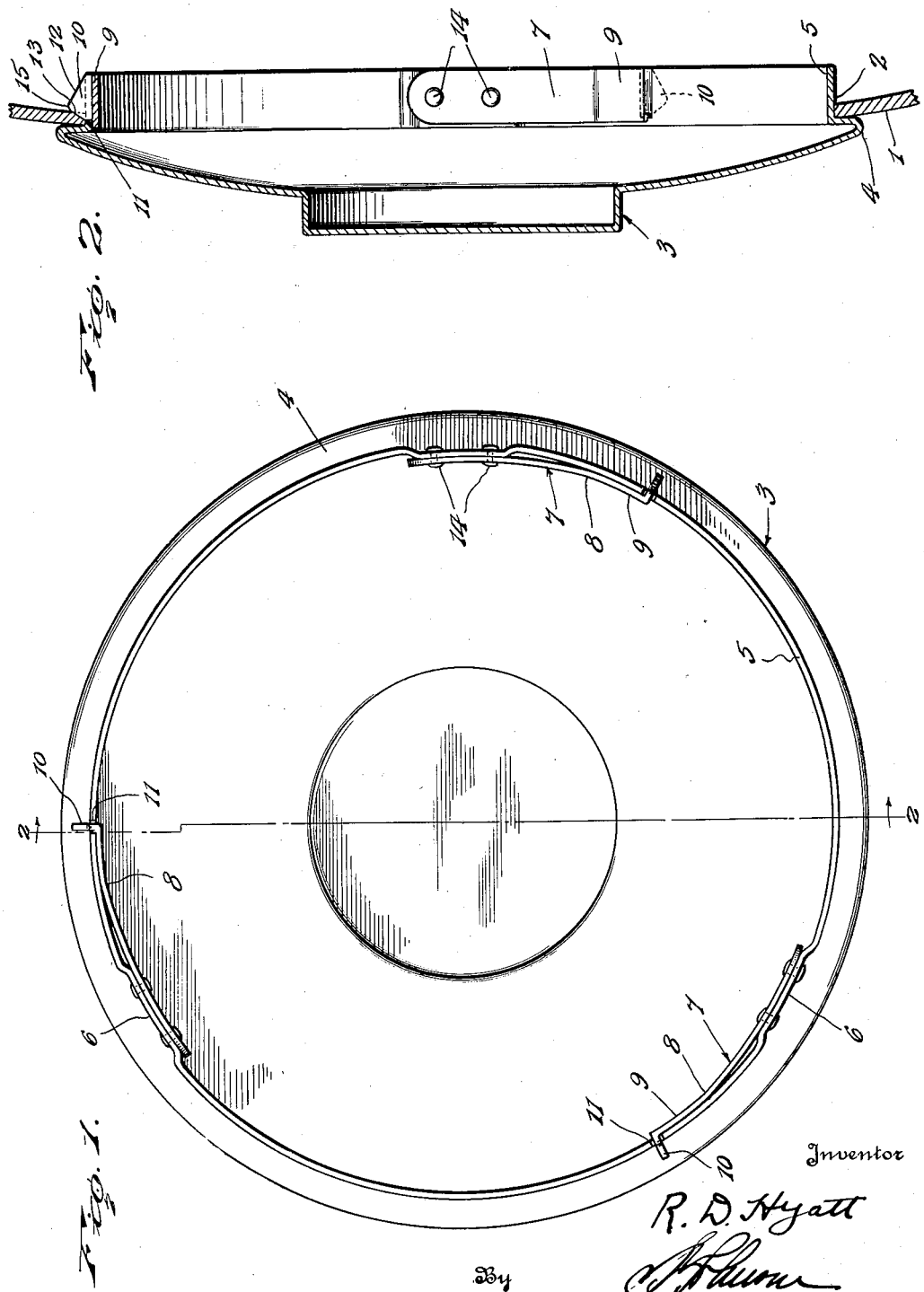

Nov. 29, 1932.  R. D. HYATT  1,889,070
HUB CAP FASTENER
Filed May 29, 1930   2 Sheets-Sheet 2

Inventor
R. D. Hyatt
By
Attorney

Patented Nov. 29, 1932

1,889,070

UNITED STATES PATENT OFFICE

RAYMOND D. HYATT, OF COLUMBUS, OHIO, ASSIGNOR TO THE D. L. AULD COMPANY, OF COLUMBUS, OHIO

HUB CAP FASTENER

Application filed May 29, 1930. Serial No. 457,058.

The present invention is directed to improvements in hub cap fasteners for motor vehicle wheels, and more particularly for securing to the hub shell caps of comparatively large dimensions.

The primary object of the invention is to provide a device of this character which can be easily secured in place and readily removed, the removal thereof, however, being accomplished with some difficulty, thus preventing accidental displacement of the cap.

Another object of the invention is to provide a cap equipped with fastening means which when engaged with the hub shell will effectively retain the cap in locked position and against relative rotation with respect to the hub shell.

Still another object of the invention is to provide a device of this kind having spring fastening arms of considerable strength in order that they will bite into the hub shell with sufficient tenacity to prevent rotation of the cap with respect to the hub shell, but at the same time will permit the cap to be applied with comparative ease.

Another object of the invention is to provide a device of this type which is extremely simple in construction, durable, effective in operation, and one which can be manufactured at a minimum cost.

With these and other objects in view, this invention resides in the novel features of construction, formation, combination and arrangement of parts to be hereinafter more fully described, claimed and illustrated in the accompanying drawings, in which:—

Figure 1 is a rear elevation of the hub cap.

Figure 2 is a sectional view on line 2—2 of Figure 1.

Figure 3:
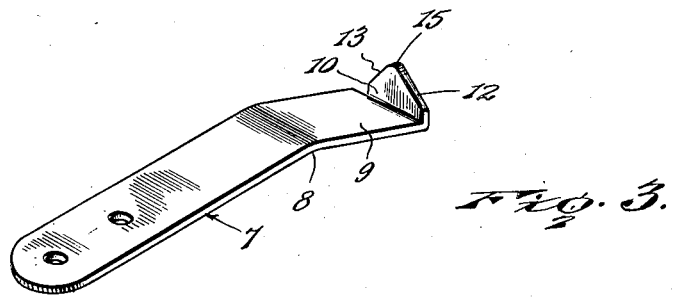
Figure 3 is a perspective view of one of the spring arms.

Referring to the drawings, 1 designates a conventional form of hub shell, which is secured in any suitable manner to the wheel hub, said shell having a relatively large central opening 2.

The hub cap 3 is formed from suitable sheet metal and is fashioned to provide an annular bead 4 which terminates in a horizontal flange 5 adapted to snugly fit into the opening 2 of the hub shell.

The cap 3 is of a diameter substantially the same as the opening 2, which as before stated, is relatively large in order that the cap will be of greater diameter than caps used before the advent of the large caps now in vogue. Caps of the character to which this invention pertains are of such size that the trade name or insignia of the car can be prominently displayed upon the cap, and ample room provided for ornamentation, such for instance an enamel inlay, thus lending to the cap an attractive appearance.

The flange 5 not only serves as a guide for applying the cap to the opening 2 of the hub shell, but also constitutes supporting means for the spring fasteners to be presently described in detail.

The flange 5 is provided at equi-distant points with flat sections 6, the number of which may vary, but must correspond to the number of spring arms 7 employed. As shown in Figure 3 three arms are illustrated and are of substantially the same width as the flange 5.

The arms are flat for a major distance of their length in order that they will lie flush against the inner faces of the flat sections 6.

The arms are bent transversely, as at 8, to provide angularly disposed plates 9, which lie flush against the inner surface of the flange 5 when the cap is detached from the hub shell. The outer ends of the plates 9 terminate in lugs 10, which are turned at right angles to the plates and are movable in slots 11 formed transversely in the flange 5.

The lugs are formed with beveled edges 12 and 13, the edges 12 being somewhat longer than the edges 13 and constitute means for guiding the lugs into the opening 2 of the hub shell during application of the hub cap. The engaging edges of the lugs are sheared flat and are hardened in order that the edges 13 will bite into the inner periphery of the opening 2 as the cap is applied, and due to this biting action rotation of the flange within the opening will be positively prevented.

The arms 7 are secured to the flat faces of the sections 6 by rivets 14, or in any other suitable manner.

To apply the cap to the hub shell the flange 5 thereof is pressed into the opening 2, whereupon the beveled edges 12 will engage the wall of the opening, thus flexing the arms 7 inwardly. When the bead 4 of the cap encounters the shell the lugs will be depressed to their fullest extent, and as soon as the apex 15 of the lug passes the inner periphery of the opening 2, the arms 7 will move outwardly, whereupon the shorter edges 13 will ride upon the wall of the opening 2 and due to their beveled formation will tightly grip the shell between the bead 4 and the edges 13, thus firmly and positively interlocking the cap and shell. Owing to the strength of the spring arms 7 the edges 13 of the lugs will bite into the shell, which is of comparatively soft metal, thus preventing the flange 5 turning in the opening 2.

It will thus be seen that due to the beveled formation of the edges 12 that the flange 5 of the cap can be pressed into the opening 2 with comparative ease, but cannot be removed without some difficulty owing to the angle of the beveled edges 13, which as will be noted, are sharper than the edges 12, thus assuring that the cap will be held firmly in place after being applied.

Figure 4:
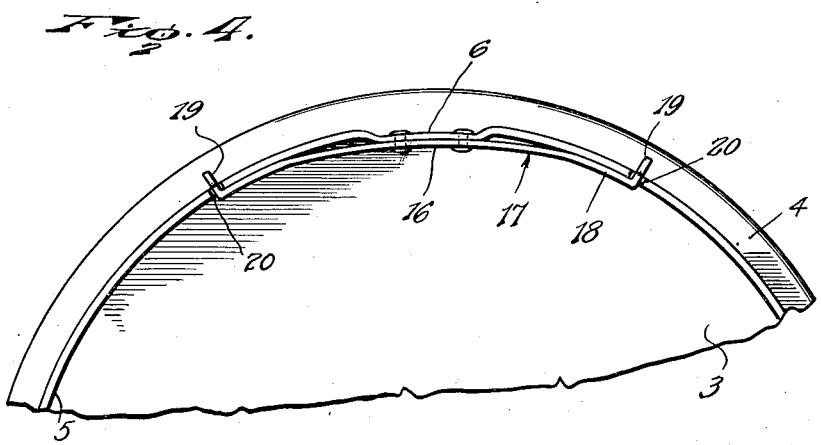
Figure 4 is a fragmentary rear elevation of a modified form of the invention.
Figure 5:
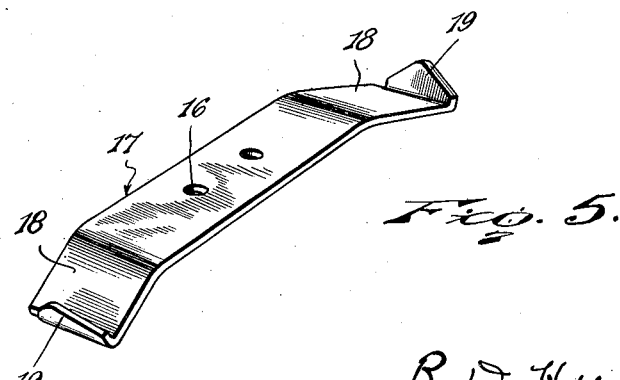
Figure 5 is a perspective view of a modified form of spring arm.

As shown in Figures 4 and 5, a modified form of the invention, the flange 5 has secured to its flat sections 6 the intermediate flat parts 16 of the spring arms 17, said arms having upon both ends angularly disposed plates 18, which in turn terminate in lugs 19 of the same shape and character as the lugs 10. The lugs 19 move in slots 20 formed in the flange 5. Since the lugs 19 operate in the same manner as the lugs 10, a detailed description of the operation thereof is not deemed necessary. The provision of the doubled lugged arms may be desirable in some instances.

What is claimed is:—

1. The combination with a hub shell having a central opening, of a hub cap having an annular flange adapted to removably engage in said opening, a bead upon the cap, said flange having slots formed therein, spring arms fixed to the flange and provided with angularly disposed plates engageable with the flange when the flange is disengaged from the shell opening, lugs upon the terminals of the plates and movable in said slots, said lugs being disposed at right angles to the plates, said lugs having angularly disposed shell engaging edges varying in length, the longer of said edges serving to flex the arms and to guide the flange into the shell opening as the flange is inserted therein, the shorter of said edges operating to bite into the shell opening wall and engage said shell to hold the bead bindingly engaged therewith.

2. The combination with a hub shell having a central opening, of a hub cap having an annular flange adapted to detachably engage in the opening, a bead upon the cap, spring arms fixed to the flange and having terminal lugs including beveled edges, said lugs being disposed transversely of the arms and adapted to bite into the wall of the shell opening and to hold the shell yieldably gripped between the beveled edges of the said lugs and bead.

3. As a new article of manufacture, a hub cap having a flange, sheet metal spring arms fixed to the flange and having terminal lugs disposed in angular relation with respect to the arms, said lugs having long and short beveled edges, constituting, respectively, guiding and securing means for the flange.

In testimony whereof I affix my signature.

RAYMOND D. HYATT.